United States Patent
Cherif et al.

(10) Patent No.: US 11,665,776 B2
(45) Date of Patent: May 30, 2023

(54) SYSTEM AND METHOD FOR SYNTHESIS OF A NETWORK-ON-CHIP FOR DEADLOCK-FREE TRANSFORMATION

(71) Applicant: ARTERIS, INC., Campbell, CA (US)

(72) Inventors: Moez Cherif, Santa Cruz, CA (US); Benoit de Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 250 days.

(21) Appl. No.: 16/872,096

(22) Filed: May 11, 2020

(65) Prior Publication Data

US 2021/0204360 A1 Jul. 1, 2021

Related U.S. Application Data

(63) Continuation-in-part of application No. 16/728,335, filed on Dec. 27, 2019, now Pat. No. 11,121,933.

(51) Int. Cl.

| | |
|---|---|
| *H04W 84/18* | (2009.01) |
| *H04W 40/32* | (2009.01) |
| *H04L 69/329* | (2022.01) |
| *H04L 45/00* | (2022.01) |
| *H04L 41/12* | (2022.01) |
| *G06F 30/32* | (2020.01) |
| *G06F 30/392* | (2020.01) |
| *G06F 30/394* | (2020.01) |
| *H04L 67/1001* | (2022.01) |

(52) U.S. Cl.
CPC ............ *H04W 84/18* (2013.01); *G06F 30/32* (2020.01); *G06F 30/392* (2020.01); *G06F 30/394* (2020.01); *H04L 41/12* (2013.01); *H04L 45/46* (2013.01); *H04L 67/1001* (2022.05); *H04L 69/329* (2013.01); *H04W 40/32* (2013.01)

(58) Field of Classification Search
None
See application file for complete search history.

(56) References Cited

U.S. PATENT DOCUMENTS

| | | |
|---|---|---|
| 5,485,396 A | 1/1996 | Brasen et al. |
| 5,623,420 A | 4/1997 | Yee et al. |
| 5,638,288 A | 6/1997 | Deeley |
| 5,761,078 A | 6/1998 | Fuller et al. |
| 5,903,886 A | 5/1999 | Heimlich et al. |
| 5,983,277 A | 11/1999 | Heile et al. |
| 6,002,857 A | 12/1999 | Ramachandran |
| 6,134,705 A | 10/2000 | Pedersen et al. |

(Continued)

FOREIGN PATENT DOCUMENTS

| | | |
|---|---|---|
| CN | 109587081 A | 4/2019 |
| CN | 113051215 A | 6/2021 |
| DE | 102015014851 A1 | 5/2016 |

OTHER PUBLICATIONS

Partha et al., Design, Synthesis, and Test of Networks on Chips, IEEE (Year: 2005).

(Continued)

*Primary Examiner* — Christine T Duong
(74) *Attorney, Agent, or Firm* — Dana Legal Service; Jubin Dana

(57) ABSTRACT

System and methods are disclosed for transformation of a network, such as a network-on-chip (NoC). The system applies a method of clustering to nodes and edges. The clustering transforms the network and produces a deadlock free and (near-)optimal network that honors the constraints of the input network's floorplan and specification.

19 Claims, 15 Drawing Sheets

(56) References Cited

U.S. PATENT DOCUMENTS

| | | |
|---|---|---|
| 6,145,117 A | 11/2000 | Eng |
| 6,249,902 B1 | 6/2001 | Igusa et al. |
| 6,360,356 B1 | 3/2002 | Eng |
| 6,378,121 B2 | 4/2002 | Hiraga |
| 6,437,804 B1 | 8/2002 | Ibe et al. |
| 6,449,761 B1 | 9/2002 | Greidinger et al. |
| 6,622,225 B1 | 9/2003 | Kessler et al. |
| 6,883,455 B2 | 4/2005 | Maeda et al. |
| 6,907,591 B1 | 6/2005 | Teig et al. |
| 7,096,436 B2 | 8/2006 | Bednar et al. |
| 7,398,497 B2 | 7/2008 | Sato et al. |
| 7,587,687 B2 | 9/2009 | Watanabe et al. |
| 7,788,625 B1 | 8/2010 | Donlin et al. |
| 8,819,611 B2 | 8/2014 | Philip et al. |
| 9,184,998 B2 | 11/2015 | Xue |
| 9,444,702 B1 | 9/2016 | Raponi et al. |
| 9,569,574 B1 | 2/2017 | Khan et al. |
| 9,792,397 B1 | 10/2017 | Nagaraja |
| 9,825,779 B2 | 11/2017 | Ruymbeke et al. |
| 9,940,423 B2 | 4/2018 | Lescure |
| 10,068,047 B1 | 9/2018 | Finn |
| 10,282,502 B1 | 5/2019 | BShara et al. |
| 10,348,563 B2 | 7/2019 | Rao et al. |
| 10,460,062 B2 | 10/2019 | Feld et al. |
| 10,990,724 B1 | 4/2021 | Cherif et al. |
| 11,121,933 B2 | 9/2021 | Cherif et al. |
| 11,281,827 B1 | 3/2022 | Labib et al. |
| 2003/0093765 A1 | 5/2003 | Lam et al. |
| 2004/0040007 A1 | 2/2004 | Harn |
| 2004/0230919 A1 | 11/2004 | Balasubramanian et al. |
| 2005/0073316 A1 | 4/2005 | Graham |
| 2005/0268258 A1 | 12/2005 | Decker |
| 2007/0174795 A1 | 7/2007 | Lavagno et al. |
| 2007/0186018 A1 | 8/2007 | Radulescu et al. |
| 2008/0046854 A1 | 2/2008 | Tang |
| 2008/0049753 A1 | 2/2008 | Heinze et al. |
| 2008/0279183 A1 | 11/2008 | Wiley et al. |
| 2008/0291826 A1 | 11/2008 | Licardie et al. |
| 2009/0031277 A1 | 1/2009 | Mcelvain et al. |
| 2009/0313592 A1 | 12/2009 | Murali et al. |
| 2010/0061352 A1 | 3/2010 | Fasolo et al. |
| 2010/0218146 A1 | 8/2010 | Platzker et al. |
| 2011/0170406 A1 | 7/2011 | Krishnaswamy |
| 2012/0013509 A1 | 1/2012 | Wisherd et al. |
| 2012/0311512 A1 | 12/2012 | Michel et al. |
| 2013/0174113 A1 | 7/2013 | Lecler et al. |
| 2013/0258847 A1 | 10/2013 | Zhang et al. |
| 2013/0283226 A1 | 10/2013 | Ho et al. |
| 2014/0115218 A1 | 4/2014 | Philip et al. |
| 2014/0126572 A1 | 5/2014 | Hutton et al. |
| 2014/0153575 A1 | 6/2014 | Munoz |
| 2014/0160939 A1 | 6/2014 | Arad et al. |
| 2014/0211622 A1 | 7/2014 | Kumar et al. |
| 2014/0298281 A1 | 10/2014 | Varadarajan et al. |
| 2015/0036536 A1 | 2/2015 | Kumar et al. |
| 2015/0106778 A1 | 4/2015 | Mangano et al. |
| 2015/0178435 A1 | 6/2015 | Kumar |
| 2015/0341224 A1 | 11/2015 | Van et al. |
| 2015/0347641 A1 | 12/2015 | Gristede et al. |
| 2016/0103943 A1 | 4/2016 | Xia et al. |
| 2016/0275213 A1 | 9/2016 | Tomita |
| 2017/0063734 A1 | 3/2017 | Kumar |
| 2017/0132350 A1 | 5/2017 | Janac |
| 2017/0177778 A1 | 6/2017 | Lescure |
| 2018/0115487 A1 | 4/2018 | Thubert et al. |
| 2018/0144071 A1 | 5/2018 | Yu et al. |
| 2018/0227180 A1 | 8/2018 | Rao et al. |
| 2019/0073440 A1 | 3/2019 | Farbiz et al. |
| 2019/0205493 A1 | 7/2019 | Garibay et al. |
| 2019/0246989 A1 | 8/2019 | Genov et al. |
| 2019/0251227 A1 | 8/2019 | Fink |
| 2019/0260504 A1 | 8/2019 | Philip et al. |
| 2019/0363789 A1 | 11/2019 | Lee et al. |
| 2020/0092230 A1 | 3/2020 | Schultz et al. |
| 2020/0162335 A1 | 5/2020 | Chen et al. |
| 2020/0366607 A1 | 11/2020 | Kommula et al. |
| 2021/0203557 A1 | 7/2021 | Cherif et al. |
| 2021/0320869 A1 | 10/2021 | Bourai et al. |

OTHER PUBLICATIONS

Alessandro Pinto et al: "System level design paradigms", ACM Transactions on Design Automation of Electronic Systems, ACM, New York, NY, US, vol. 11, No. 3, Jun. 7, 2004 (Jun. 7, 2004), pp. 537-563, XP058222500.

Bo Huang et al: "Application-Specific Network-on-Chip synthesis with topology-aware floorplanning", Integrated Circuits and Systems Design (SBCCI), 2012 25th Symposium on, IEEE, Aug. 30, 2012 (Aug. 30, 2012), pp. 1-6, XP032471227.

Srinivasan K. et al: "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE. Oct. 11, 2004 (Oct. 11, 2004), pp. 422-429, XP010736641.

David Atienza et al, Network-on-Chip Design and Synthesis Outlook, Science Direct, Integration the VLSI, journal 41 (2008) 340-359.

Jean-Jacques Lecler et al: Application driven network-on-chip architecture exploration& refinement for a complex SoC, Design Automation for Embedded Systems, vol. 15 No. 2, Apr. 7, 2011, DOI: 10.1007/S10617-011-9075-5.

Srinivasan Mural et al: "Mapping and physical planning of networks-on-chip architectures with quality-of-service guarantees", Proceedings of the 2005 Asia and South Pacific Design Automation Conference, Jan. 18, 2005, DOI: 10.1145/1120725.1120737.

Tobias Bjerregaard et al: "A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.

U.S. Appl. No. 17/134,384, filed Dec. 26, 2020, Federico Angiolini.

U.S. Appl. No. 17/665,578, filed Feb. 6, 2022, K. Charles Janac.

"A distributed interleaving scheme for efficient access to wideIO dram memory", Seiculescu Ciprian, Benini Luca, De Micheli Giovanni, CODES+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conference Alberto Ghiribaldi, Hervé Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.

K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).

Luca Benini: "Application specific Noc design", Design, Automation and Test in Europe, 2006, DATE '06 : Mar. 6-10, 2006,

(56) References Cited

OTHER PUBLICATIONS

[Munich, Germany; Proceedings] / [Sponsored by the European Design and Automation Association], IEEE, Piscataway, NJ, USA, Mar. 6, 2006 (Maar. 6, 2006), pp. 491-495, XP058393584, ISBN: 9783981080100.

Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].

Dumitriu Vet al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.

Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 *abstract* * p. 426-p. 429 *.

Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007), pp. 869-880, XP011187732, ISSN: 1063-8210, DOI: 10.1109/TVLSI.2007.900742.

Picornell Tomas TomPic@gap.upv.es et al: "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.

SYSTEM AND METHOD FOR SYNTHESIS OF A NETWORK-ON-CHIP FOR DEADLOCK-FREE TRANSFORMATION

CROSS REFERENCE TO RELATED APPLICATION

This application is a continuation-in-part of U.S. Non-Provisional patent application Ser. No. 16/728,335 titled PHYSICALLY AWARE TOPOLOGY SYNTHESIS OF A NETWORK filed on Dec. 27, 2019 by Moez CHERIF, et al., the entire disclosure of which is incorporated herein by reference.

FIELD OF THE INVENTION

The present technology is in the field of computer system design and, more specifically, related to topology synthesis to generate a deadlock-free network-on-chip (NoC).

BACKGROUND

Multiprocessor systems implemented in systems-on-chips (SoCs) communicate through networks, such as a network-on-chip (NoC). Intellectual Property (IP) blocks or elements or cores are used in chip design. The SoCs include instances of intellectual property (IP) blocks. Some IP blocks are masters. Some IP blocks are slaves. Masters and slaves communicate through a network, such as a NoC.

Transactions, in the form of packets, are sent from a master to one or more slaves using any of the many industry-standard protocols. The master, connected to the NoC, sends a request transaction to a slave, using an address to select the slave. The NoC decodes the address and transports the request from the master to the slave. The slave handles the transaction and sends a response transaction, which is transported back by the NoC to the master.

The design of the NoC, which handles all the communication between all the masters and their corresponding slaves, includes establishing a connectivity mapping for the NoC within the floorplan. The challenge is that the connectivity map must take into account the location of the IP blocks in the floorplan, which represent physical constraints in the floorplan. Additionally, in the case of a NoC, the connectivity map should avoid creating a cycle. A cycle can yield an undesirable deadlock state where the nodes along the cycle are in a circular "wait" and prevent each other from accessing the resources and from transmitting messages. Therefore, what is needed is a system and method for synthesis and transformation of a network. The process should minimize the resource usage to produce a near-optimal and cycle-free network in light of the physical constraints. The system and method should transform a given network into another network, equivalent in function, with less wires (such as less links) and less logic elements (such as less switches). Additionally, the transformation must honor the connectivity constraints of the network and not introduce any new cycles, which could lead to deadlocks.

SUMMARY OF THE INVENTION

In accordance with various embodiments and aspects of the invention, systems and methods are disclosed that generate a near-optimal network, such as a network-on-chip (NoC), while maintaining the network connectivity constraints. In accordance with various aspects and embodiments of the invention, the system applies a method of clustering to nodes and edges. The clustering transforms the network and produces a deadlock free and (near-)optimal network that honors physical constraints of the input network's floorplan and specification.

One advantage of the invention includes optimizing networks and reducing resource usage and congestion. Another advantage includes using a deadlock-aware process for reducing wiring (edges) and switches (nodes) in a network. Another advantage includes outputting optimal results when combined with the use of a physical roadmap approach. Another advantage includes generating a near-optimal or an optimal network that maintains a cycle-free construction of the generated network while every transformation is converging to better routed wiring results. Another advantage includes the ability of the system to apply the implementation to any structure of irregular networks and regular networks, including rings, meshes, and torii. Another advantage includes fast throughputs as the system implements the process with great runtime efficiency. Another advantage includes effectiveness in handling incremental changes during the synthesis process performed by the system.

BRIEF DESCRIPTION OF THE DRAWINGS

In order to more fully understand the invention, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
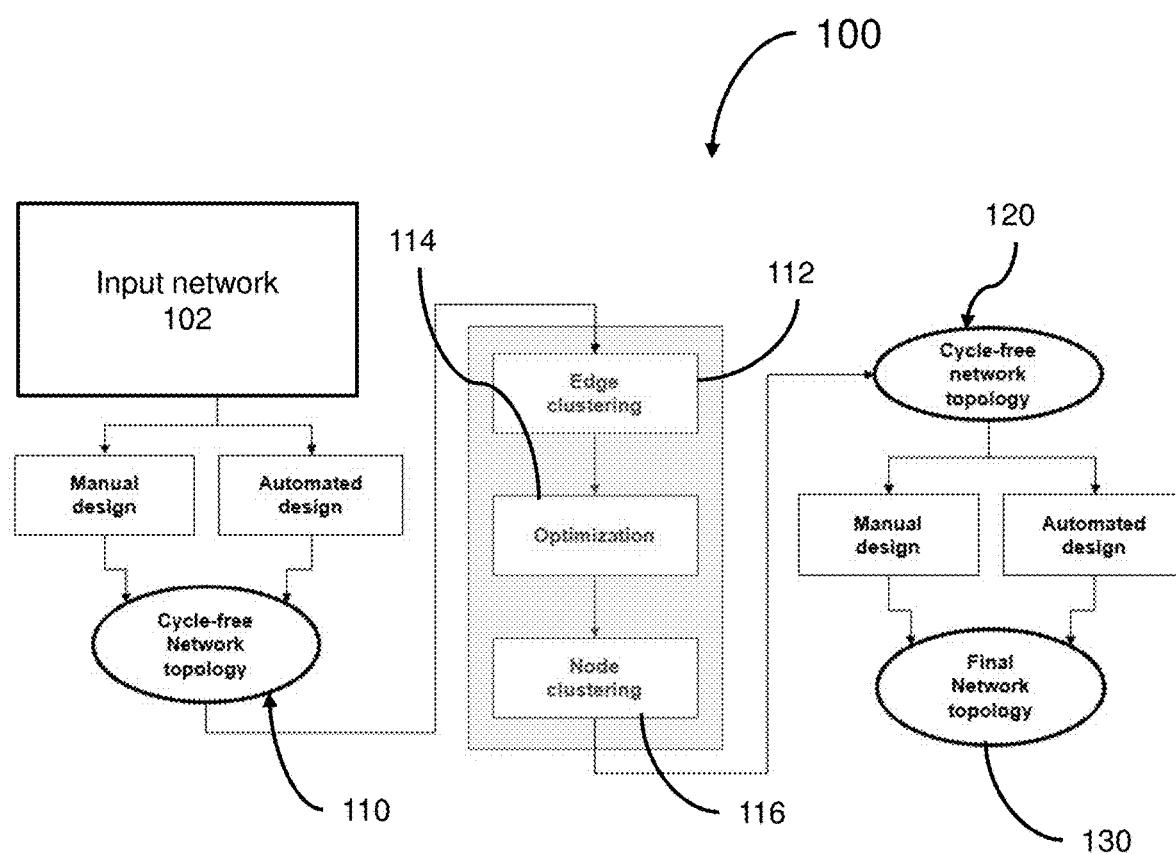
FIG. 1 shows a process for synthesis and transformation of a network to generate a new network in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

As used herein, a "master" and an "initiator" refer to similar intellectual property (IP) blocks, units, or modules. The terms "master" and "initiator" are used interchangeably within the scope and embodiments of the invention. As used herein, a "slave" and a "target" refer to similar IP blocks; the terms "slave" and "master" are used interchangeably within the scope and embodiments of the invention. As used herein, a transaction may be a request transaction or a response transaction. Examples of request transactions include write request and read request.

As used herein, a node is defined as a distribution point or a communication endpoint that is capable of creating, receiving, and/or transmitting information over a communication path or channel. A node may refer to any one of the following: switches; splitters, mergers, buffers, and adapters. As used herein, splitters and mergers are switches; not all switches are splitters or mergers. As used herein and in accordance with the various aspects and embodiments of the invention, the term "splitter" describes a switch that has a single ingress port and multiple egress ports. As used herein and in accordance with the various aspects and embodiments of the invention, the term "merger" describes a switch that has a single egress port and multiple ingress ports.

In accordance with various aspects and one embodiment of the invention, the synthesis and transformation are performed on a deadlock-free network, as described herein. The resulting transformed network topology will also be cycle-free. As used herein, a "cycle-free" network is a network where there is no route or path that traverses the same node twice. The terms "path" and "route" are used interchangeable herein. Paths includes and are made up of any combination of nodes and edges (also referred to herein as links), along which data travels form source to destination. In accordance with the various aspects and embodiments of the invention, the following notations are defined as:

E is an arbitrary edge or a link
LE is a longest edge
BE is a set of booked edges
NBE is a set of non-booked edges
CL is an edge cluster or a cluster of links
G(CL) is the total gain (or cost) of a CL
WL is the wire length for an edge or link
WL(CL) is the total wire length of cluster CL Referring now to FIG. 1, a process 100 is shown in accordance with the various aspects of the invention for synthesis and transformation of a network to generate a cycle-free network that is near-optimal or optimal. In accordance with one embodiment of the invention, the input network is cycle-free. In accordance with various other embodiments of the invention, the input network is an arbitrary network, which may be a network with cycles, a network with irregular topologies, and a network with regular topologies (e.g., meshes, rings, torii, etc.).

The synthesis/transformation process includes edge clustering and node clustering. The synthesis process minimizes the resource usage and produces a near-optimal cycle-free network. The resulting network structure adheres to the physical constraints of the floorplan described as part of the specification. In accordance with some aspects of the invention, the synthesis process includes optimizing an objective function and optimizing global cost corresponding to the total routed wire length (representing the links) of the edges of the network. In accordance with various aspects and embodiments of the invention, the two clustering phases (edge clustering and node clustering) operate while keeping the input network cycle-free; the synthesis processes converges towards an optimal structure. This is achieved using two network transformations: edge clustering and node clustering. These transformations take an existing network as input, and produces a network as output, which is more optimal according to some metric, than the input network. These transformations do not introduce cycles in the newly generated network, which is a key result and beneficial because cycles cause deadlocks as explained. In accordance with various aspects and embodiments of the invention, the synthesis process restructures the network to remove cycles if any, and then applies clustering and optimization while honoring and maintaining the cycle-free property. Additionally, the physical constraints of the floorplan are maintained and honored.

As shown in FIG. 1, a synthesis process 100 shows an overall synthesis flow that includes two transformation or clustering phases. The input network 102 is arbitrary. The input network 102 can be designed manually (such as by a human) or productized (automated design) by a computer-aided design tool. In accordance with one aspect and embodiment of the invention, the input network 102 is used and the synthesis process 100 starts with a cycle-free network topology 110. As noted, the network topology 110 can be any arbitrary network in accordance with some other aspects and embodiments of the invention. The synthesis process 100 uses a transformation module 112 that performs edge clustering transformation on the network topology 110 to generate an edge clustered network topology. The synthesis process 100 uses an optimization module 114 to optimizes the edge clustered network topology. The synthesis process 100 uses a transformation module 116 to perform node clustering on the optimized network topology. The resulting network topology 120 is a cycle-free network topology. In accordance with one aspect of the invention, the resulting network topology 120 may be processed by a user for further optimization and design finishing that is used to generate the final network topology 130. In accordance with other aspects of the invention, the resulting network topology 120 may be processed by a synthesis tool for further optimization and design finishing that is used to generate the final network topology 130. As noted, in accordance with some other aspects and embodiments of the invention, the resulting network topology 120 is a cycle-free network topology even if the starting network topology, such as network topology 102, had cycles.

Figure 2:
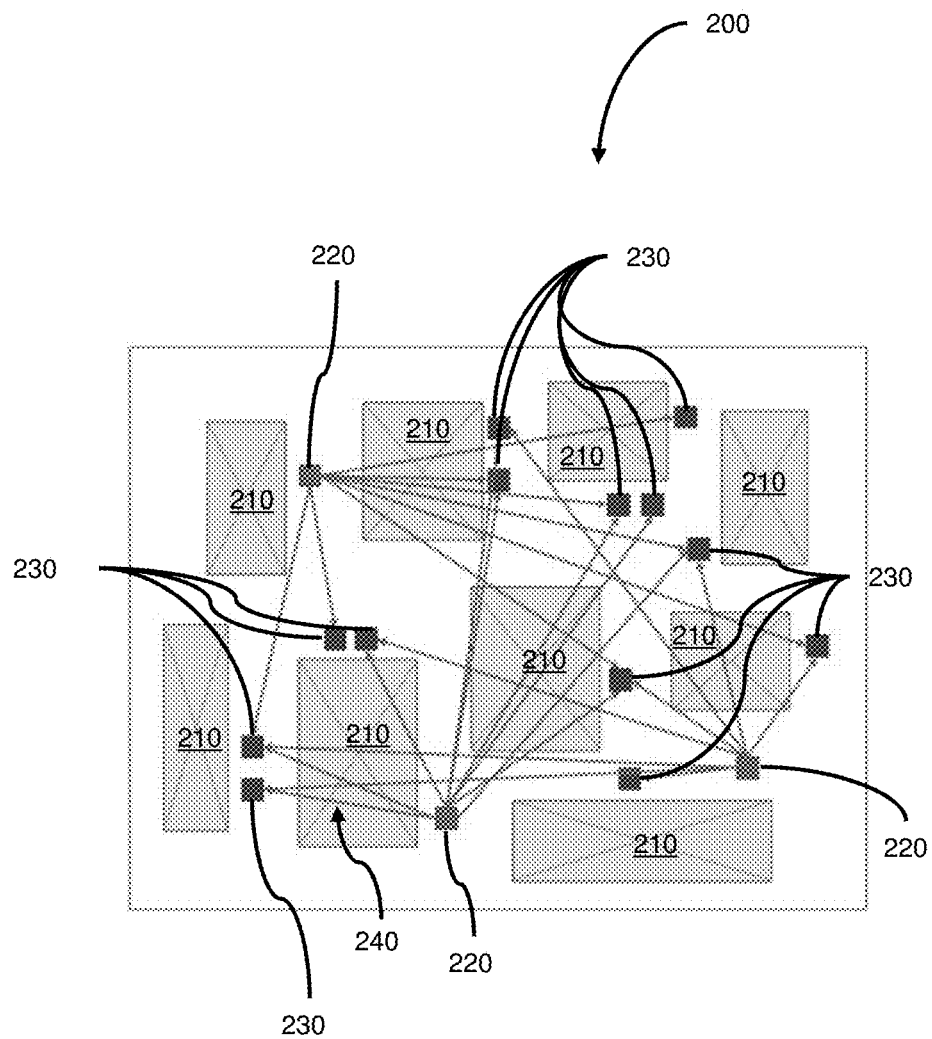
FIG. 2 shows a network, which includes three source nodes and thirteen sink nodes, implemented in a floorplan with physical constraints in accordance with the various aspects and embodiments of the invention.

Referring now to FIG. 2, shows a floorplan 200 that includes nine forbidden regions 210, three source nodes 220 in communication with thirteen sink nodes 230 in accordance with various aspects and embodiments of the invention. The floorplan 200 shows a direct communication connectivity using the direct edges, such as edge (or link) 240, between the source nodes 220 and the sink nodes 230. As indicated, forbidden regions 210 indicate spaces on the floorplan that links or edges cannot traverse; the links must be placed in areas on the floorplan that are not occupied by the forbidden regions 210. In accordance with the various aspects and embodiments of the invention, the system receives as input any network structure implementing the floorplan 200 with the connectivity between the source nodes 230 and sink nodes 240. The floorplan 200 is provided to the system as a map. The system processes the map using edge and node clustering to produce a more optimized structure.

In accordance with the various aspects and embodiments of the invention, the input network has cycles. Accordingly, edge and node clustering does not aim to break the existing cycles. The system will optimize the network without increasing the number of existing cycles. In accordance with the various aspects and embodiments of the invention, the input network is cycle-free. Accordingly, the optimized network will also be cycle-free.

Figure 3:
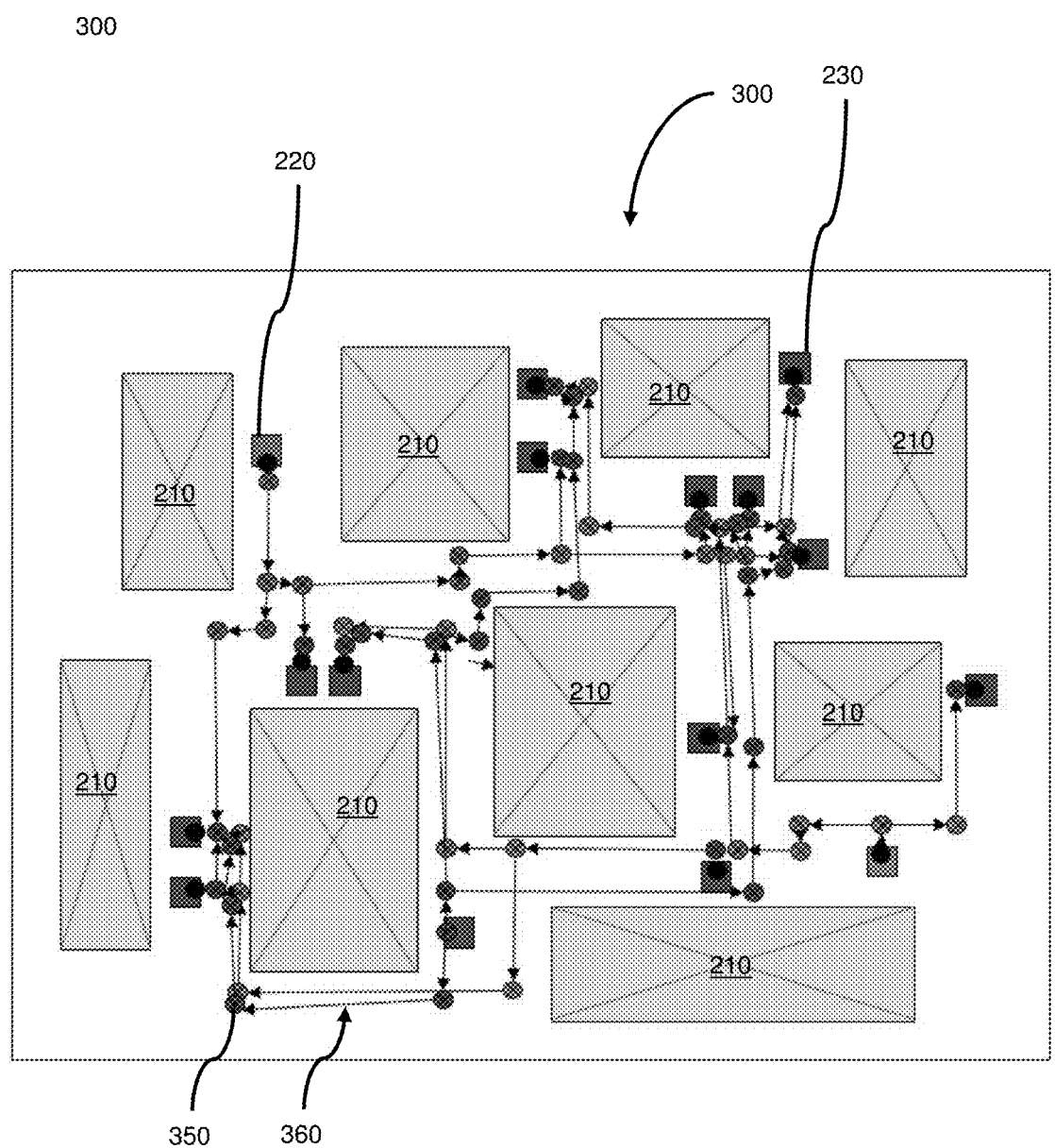
FIG. 3 shows a connectivity map, which includes nodes and edges, for the network of FIG. 2 in accordance with the various aspects and embodiments of the invention.

Referring now to FIG. 3, one example of a connectivity network 300 implementing the communication connectivity (or links) of the floorplan 200 of FIG. 2. Nodes are switches and other active network elements. In accordance with the various aspects and embodiments of the invention, the connectivity network 300 includes switches, such as switch 350. In accordance with the various aspects and embodiments of the invention, the connectivity network 300 includes edges, such as edge 360. Edges are links between nodes; links are bundles of electrical connections. Nodes and links make up a path. In accordance with the various aspects and embodiments of the invention, many nodes are in the vicinity of each other. In accordance with the various aspects and embodiments of the invention, many edges are of similar shapes because the edges start and end at neighboring nodes and their profiles can be assimilated. The system combines nodes and edges that can be assimilated. In accordance with the various aspects and embodiments of the invention, the edges and nodes that can be assimilated are combined to obtain an improved network because the combination lowers the number of wires and logic elements of the network while maintaining an equivalent function.

Figure 4:
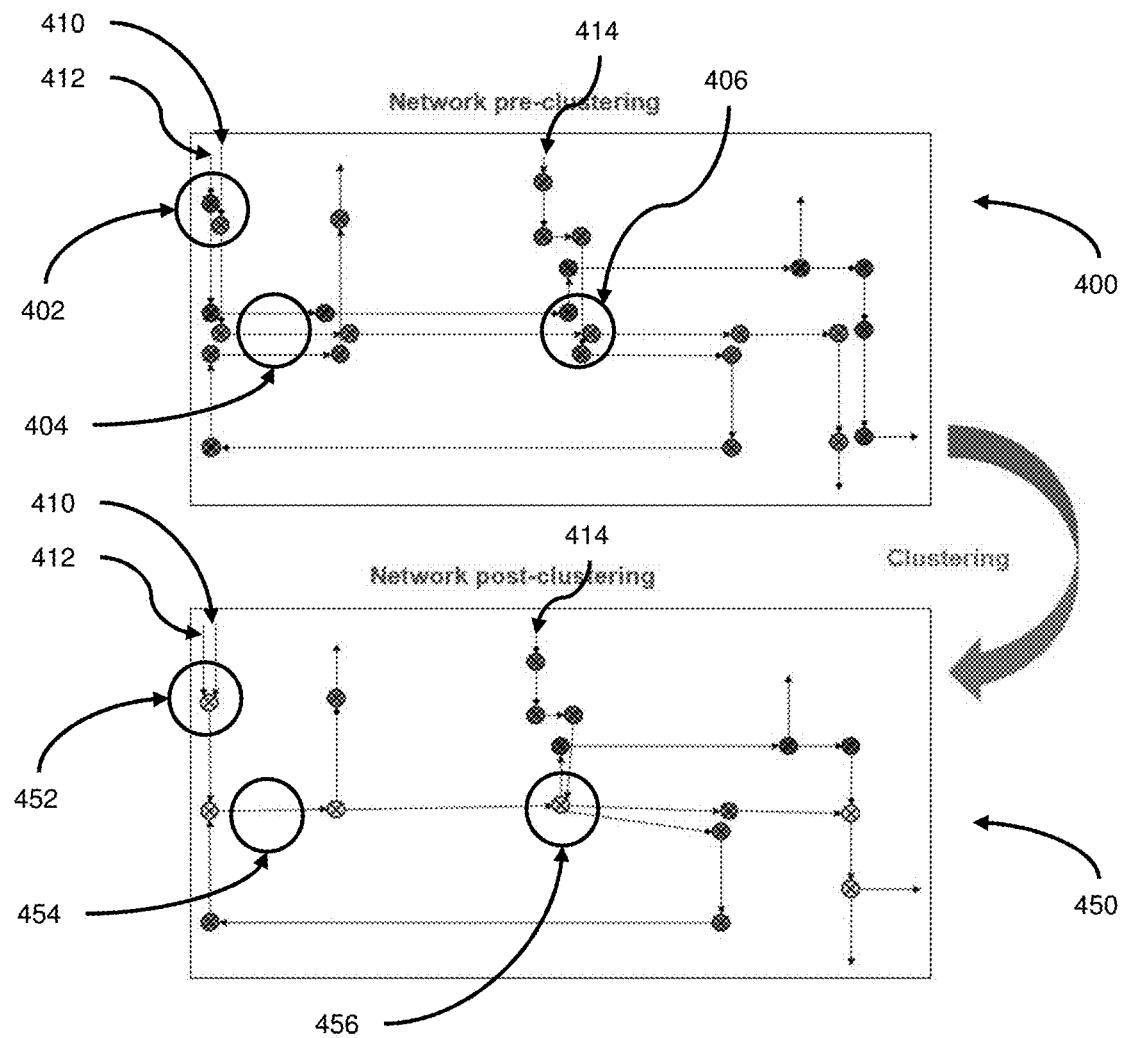
FIG. 4 shows a map of an input network, which includes three trunks, that is transformed into a new network, which is represented by a new map, using brute force clustering.

Referring now to FIG. 4, a pre-clustering map 400 and a post-clustering map 450 are shown in accordance with the various aspects and embodiments of the invention. The map 400 and the map 450 include switches and links. For illustration purposes, reference is made to only a portion of the network 300 of FIG. 3, which is the input network and the structure on which clustering operates. In accordance with the various aspects and embodiments of the invention, the map 400 is shown with multiple switches, such as switches 402, and multiple links, such as links 404. The map 450 of the sub-network shows the result of clustering when applied to three trunks 410, 412, and 414. In accordance with the various aspects and embodiments of the invention, the map 450 is shown with multiple switches, such as switch 452, and multiple links, such as link 454. In accordance with the various aspects and embodiments of the invention, the switches 402 can be assimilated. The assimilation of the switches 402 results in is the switch 452. This is the process for node clustering. In accordance with the various aspects and embodiments of the invention, the links 404 can be assimilated. The assimilation of the links 404 results in the link 454. This process is referred to as edge clustering The map 400 represents a sub-network that includes three disjoint trunks 410, 412, and 414 of the input network, such as network 300. The nodes and edges can be stacked on the top of each other or spaced as in the picture. In accordance with the various aspects and embodiments of the invention, each trunk 410, 412, and 414 has no cycle because the input network, such as network 300, is cycle-free. As noted herein, in accordance with the various aspects and embodiments of the invention, the process of edge clustering and node clustering operates in a similar manner on networks with cycles, which can be the input network.

In accordance with the various aspects and embodiments of the invention, clustering produces a more compact and optimized structure in terms of resource usage (wire length, performance, etc.) and which keeps the network cycle-free. This is achieved by clustering and collapsing "similar" edges and neighboring nodes. The map 450 of the network is cycle-free, optimal, and implements the same local connectivity map, such as the map 400. A local connectivity map here is a map between inward points to the trunks and their outward points. Clustering maintains connectivity locally and globally (i.e., between sources and sinks) throughout every transformation. For example, switches 406 can be clustered to result in switch 456. The trunk 414 appears to have a looping shape, which can create a cycle and, hence a deadlock, if the clustering is applied with brute force. In accordance with the various aspects and embodiments of the invention, to prevent this cycle possibility and the potential for a deadlock, clustering will only be applied when it does not introduce a cycle. To maximize benefits, the process reduces mainly long edges or links.

Figure 5:
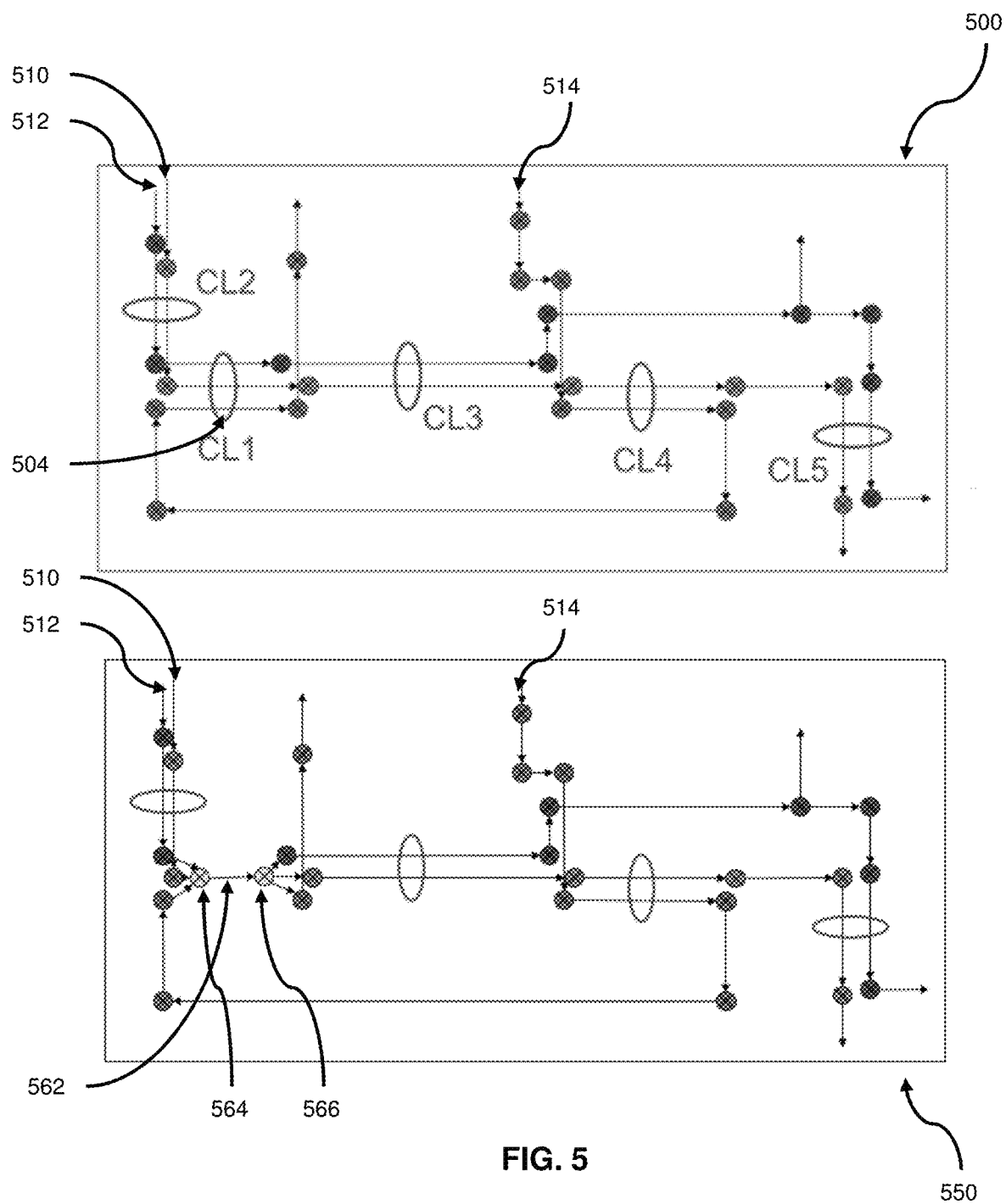
FIG. 5 shows a map of an input network, which includes three trunks, that is transformed and synthesized to generate a new network represented by a new map in accordance with the various aspects and embodiments of the invention.

Referring now to FIG. 5, a map 500 of a pre-cluster network is shown with edge cluster or cluster link (CL) groupings, such as CL1, CL2, CL3, CL4, and CL5 and three trunks 510, 512, and 514 in accordance with the various aspects and embodiments of the invention. The CL groups are potential groups for implementing edge clustering, each of which can be implemented in any order depending on the defined objective in accordance with the various aspects and embodiments of the invention. A map 550 of a post-cluster network is shown with clustering implemented for the edges in CL1 grouping.

In accordance with the various aspects and embodiments of the invention, one objective and focus of performing edge clustering is to minimizing long edges. Many long edges traversing a narrow corridor between 2 or more forbidden regions can lead to wire congestion. Minimizing the wiring of long edges contributes to lowering congestion. In accordance with the various aspects and embodiments of the invention, the length of an edge (link) is measured as the length of the routed wires between the edge's end points.

In accordance with the various aspects and embodiments of the invention, all edges (links) are initially marked as non-booked. An edge (or link) is considered "booked" if it has been already selected and assigned to a cluster of edges or CL. For example, the links 504 are booked links because they are selected and assigned to CL1.

In accordance with one embodiment of the invention, the edge clustering operates iteratively and applies at every iteration two main steps: (1) building edge clusters, such as CL1; and (2) collapsing edges (the links of CL1) and implementing clusters.

FIG. 5 shows the map 500 for a set of identified clusters. The process, as outlined below in accordance with the various aspects and embodiments of the invention, identifies all the potential edge clusters, which are labelled in map 500 as CL1, CL2, CL3, CL4, and CL5. Potential clusters are groups of edges that are close to each other and go in the same direction. For clarity and simplicity, the example implementation of cluster CL1 is discussed and the process outline below. In accordance with the various aspects and embodiments of the invention, the map 550 shows the resulting outcome of collapsing CL1, wherein the three links 504 have been collapsed resulting in a link 562 and two new nodes 564 and 566. More specifically, the implementation of the cluster CL1 includes removing all the edges 504 of CL1 and inserting one single edge 562 connected to the nodes 564 and 566. To preserve the network connectivity of the input network, all start points of the original edges of CL1 are connected to the node 564 and all the end points of the edges of CL1 are connected from the node 566. Thus, instead of using 3 long edges 504 of CL1, after implementation of the cluster grouping CL1, the network now uses 6 small edges and one long edge or link 562 to honor the original connectivity. On this simple example, the cost of the clusters was the cardinality of the edges. In accordance with one embodiment of the invention, the process starts implementation with the biggest cluster first, and so forth. In accordance with the various aspects and embodiments of the invention, if the cost is a gain in terms of wire length, then the implementation of clustering would have started with CL3 because of the wire length for each edge of the CL3 grouping.

As noted in accordance with the various aspects of the invention, the process of edge clustering operates iteratively and includes grouping the edge in disjoint clusters, such as CL1, CL2, CL3, CL4, and CL5. Once the grouping of edges or CLs are identified, each CL is ranked with respect to the gain, which is in terms of how much wire length reduction is achieved and/or performance is improved. The list of clusters (the CLs) is then sorted in descending order of the computed gain. The sorted list is then traversed and the best cluster is selected for implementation. Once this is done, there are two possible cases. In accordance with the various aspects and embodiments of the invention, if all edges of the cluster group were found admissible and compatible, then the implementation takes effect and there is no need to update the remaining clusters. The process selects the next best cluster in the sorted list and proceed with its cluster implementation.

In accordance with the various aspects and embodiments of the invention, if there were rejected edges because they introduce new cycles or break some of the specified constraints, then the process excludes the edges (links) from the current cluster. The process identifies if the excluded edges can be grouped within the next cluster. This ensures that all edges are considered for clustering and optimization.

The implementation of a cluster of compatible and admissible edges operates by considering all the edges of the network or sub-network that are provided as an input. The process traverses all edges. The process identifies, for each edge, if collapsing the edge with the other cluster edges can lead to a cycle. Cycles are identified with a graph search across the totality of the network looking for paths connecting predecessors and successors of the edges' end points. Edges introducing cycles are removed or excluded from the cluster. In accordance with the various aspects and embodiments of the invention, once a cluster is fully validated as cycle-free, the cluster is implemented. Then process continues building and implementing the next cluster, and so forth until all of the edges have been considered. In accordance with the one aspect and embodiment of the invention, to maintain runtime efficiency, the process checks for the cycle-free acceptance only when the cluster is picked up for implementation. The advantage achieved is to avoid disqualifying good edges from cluster grouping with others early in the process.

The step of building clusters works iteratively. At each iteration, the process first creates an empty cluster CL and selects the longest edge (LE) among the set of non-booked edges (NBE). Then, the process traverses the NBE and extracts edges that are traveling in the same direction as the LE and the endpoints are in the vicinity of the endpoints of the LE. Building the cluster around the LE is an iterative process based on recomputing the centroid of the edges and recognizing/assimilating new edges that lie in its vicinity. This scheme has the advantage of better covering the general case of non-vertical and non-horizontal edges.

In accordance with the various aspects and embodiments of the invention, only edges that are close, in the same direction, and do not introduce cycles are kept in a cluster grouping. Once all of the edges are marked as booked and moved from the NBE set to the BE set, the cluster is ready to be implemented and the edges can be collapsed.

Figure 6:
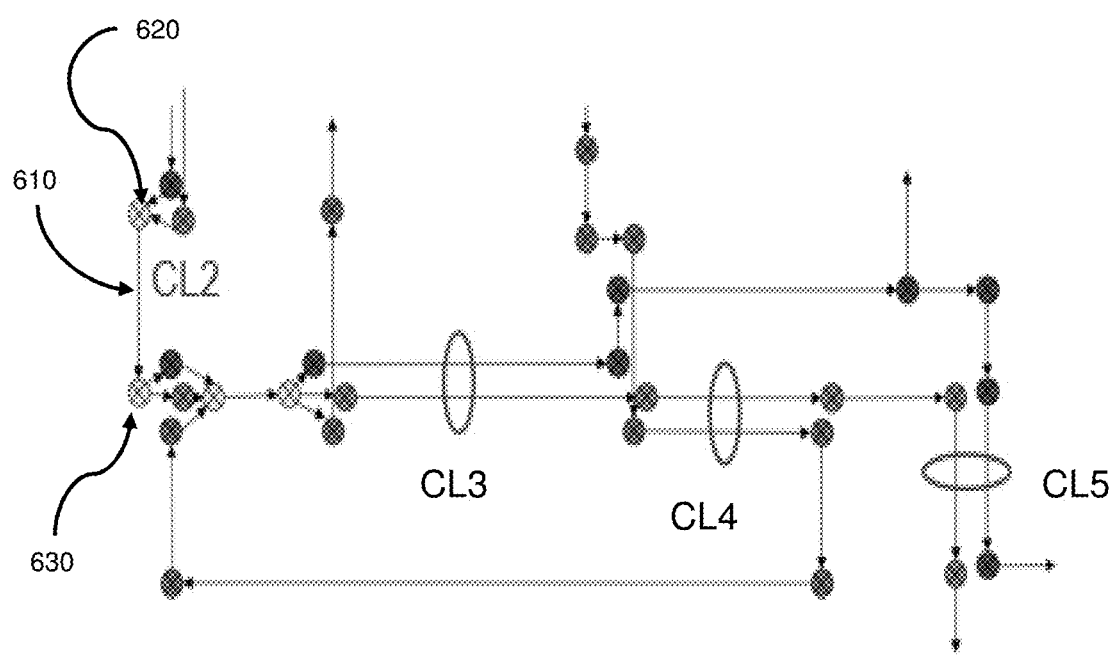
FIG. 6 shows a map, which is of the new network of FIG. 5, that is transformed to generate another new network represented by a new map in accordance with the various aspects and embodiments of the invention.
Figure 7:
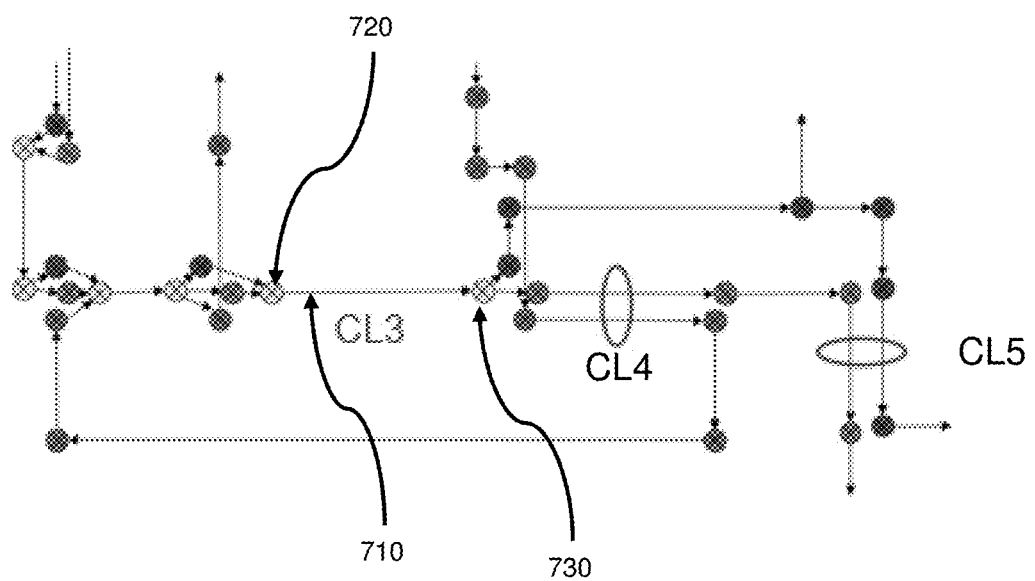
FIG. 7 shows a map, which is of the new network of FIG. 6, that is transformed to generate another new network represented by a new map in accordance with the various aspects and embodiments of the invention.
Figure 9:
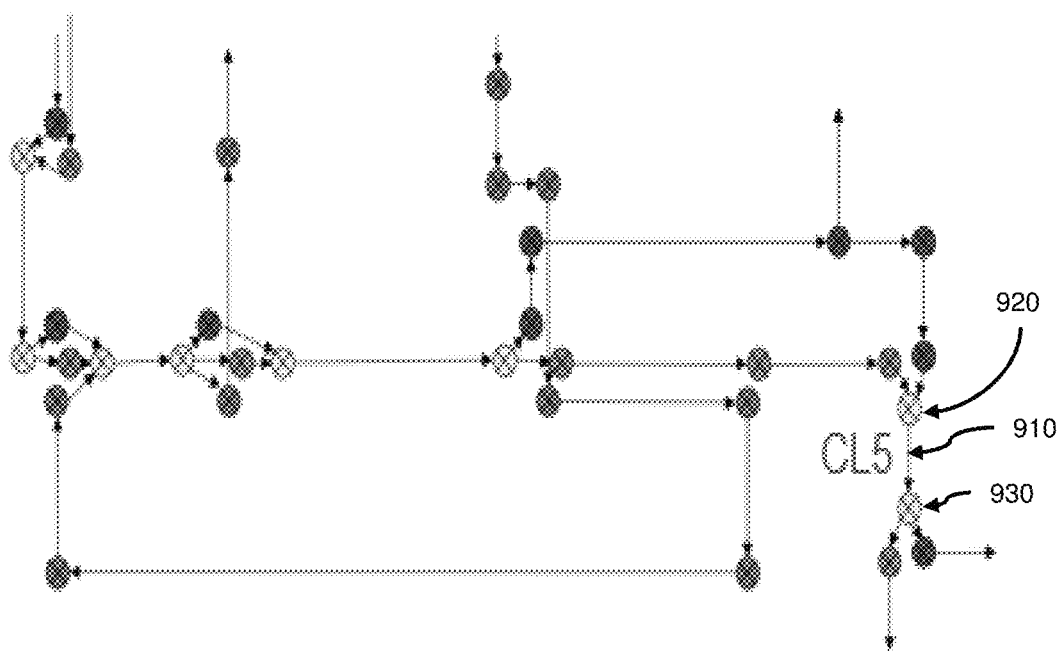
FIG. 9 shows a map, which of the network of FIG. 8, that is transformed to generate another new network represented by a new map in accordance with the various aspects and embodiments of the invention.

Referring now to FIG. 6, FIG. 7 and FIG. 9, the process for implementing edge clustering on the remaining cluster groups CL2, CL3, and CL5 is shown in accordance with the various aspects and embodiments of the invention. In FIG. 6, edge clustering is implemented for CL2 resulting in edge 610 and nodes 620 and 630. In FIG. 7, edge clustering is implemented for CL3 resulting in edge 710 and nodes 720 and 730. In FIG. 9, edge clustering for the CL5 implemented, which results in edge 910, node 920 and node 930.

Figure 8:
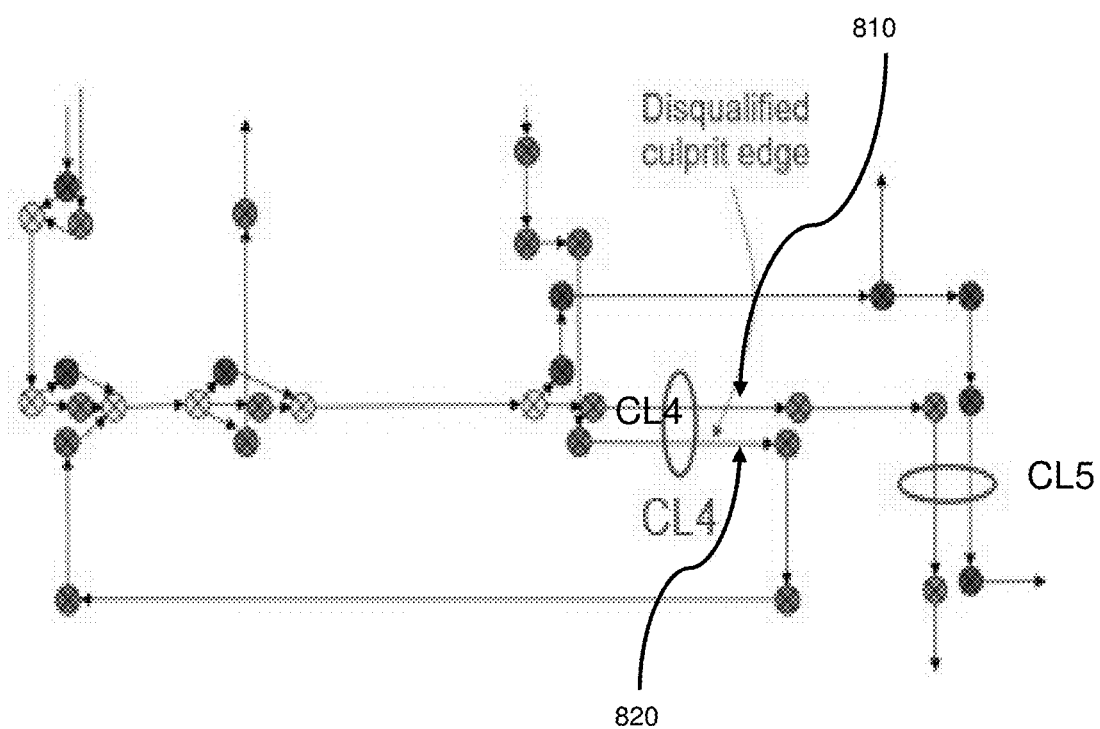
FIG. 8 shows a map, which is of the new network of FIG. 7, without edge clustering implemented in order to avoid cycles in accordance with the various aspects and embodiments of the invention.

Referring now to FIG. 8, the edge cluster CL4 includes edge 810 and edge 820. Implementing cluster grouping on CL4 would produce a cycle due to the edge 820 because implementation of the edge cluster for CL4 would result in only one edge in place of edge 810 and edge 820. Accordingly, no implementation was performed on CL4 leaving the paths disjoined and preserving the cycle-free property of the network. In accordance with the various aspects of the invention, if there were other edges in the area of the edge 810 and if the edge 810 could be selected to be part of another cluster, then edge 810 would have been selected and collapsed as part of another cluster. The process is dynamic and keeps converging towards the optimal solution when there are options for alternative cluster grouping and there is room in the floorplan.

Figure 10A:
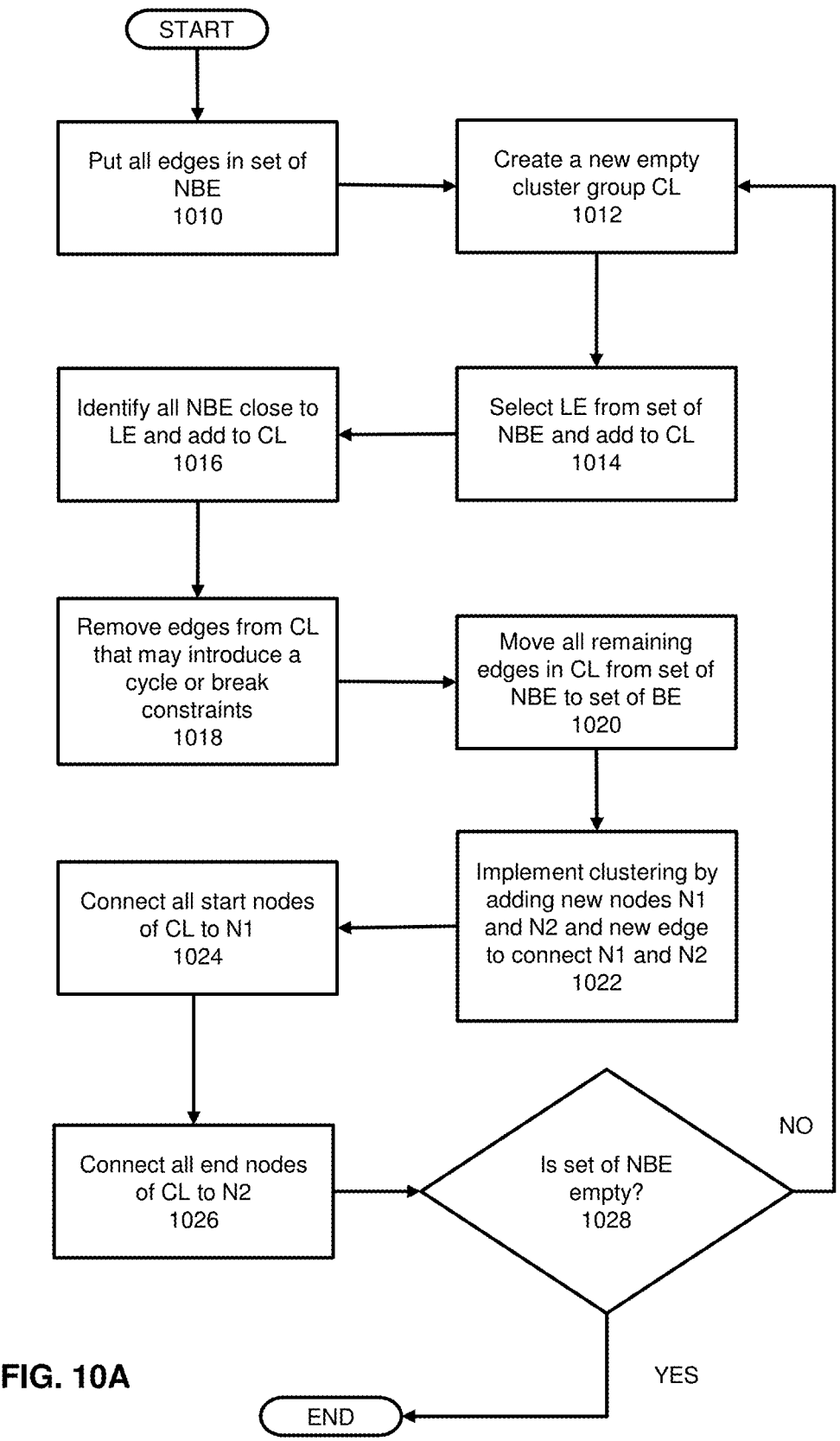
FIG. 10A shows a flow process for implementing edge cluster grouping in accordance with the various aspects and embodiments of the invention.

Referring now to FIG. 10A, the process for generating edge cluster groupings, such as CL, is shown in accordance with the various aspects of the invention. At step 1010, the system receives, as an input, a network (or sub-network) that is cycle-free and assigns all the edges to a set of NBE. At step 1012, the system creates a new and empty cluster group $CL_{New}$ to add edges. At step 1014, the system traverses the edges of the network and selects a LE from the set of NBE; the selected LE is added to the CL. At step 1016, the system identifies all NBE that are close to the selected LE and adds the proximity edges to the CL. At step 1018, the system removes any proximity edges from the CL, which were added at step 1016, if the proximity edge would introduce a cycle or violate any network constraints. The result is an updated CL with a set of edges can be implemented during the cluster implementation step. At step 1020, the system moves the edges that are part of the CL from the set of NBE to a set of BE. At step 1022, the system implements the cluster grouping and replaces the edges in the CL with two new nodes N1 and N2 and a new edge. The nodes N1 and N2 are connected by the new edge. At step 1024, the system connects all nodes that are at a starting point of the CL to the node N1 using short edges. At step 1026, the system connects all nodes that are at an ending point of the CL to the node N2. At step 1028, the system determines if there are other edge in the NBE or if the set of NBE is empty. If the set of NBE is not empty, then the system iterates the cluster grouping process by returning to step 1012. If the set of NBE is empty, then there are no other edges in the set of NBE and the process ends.

Figure 10B:
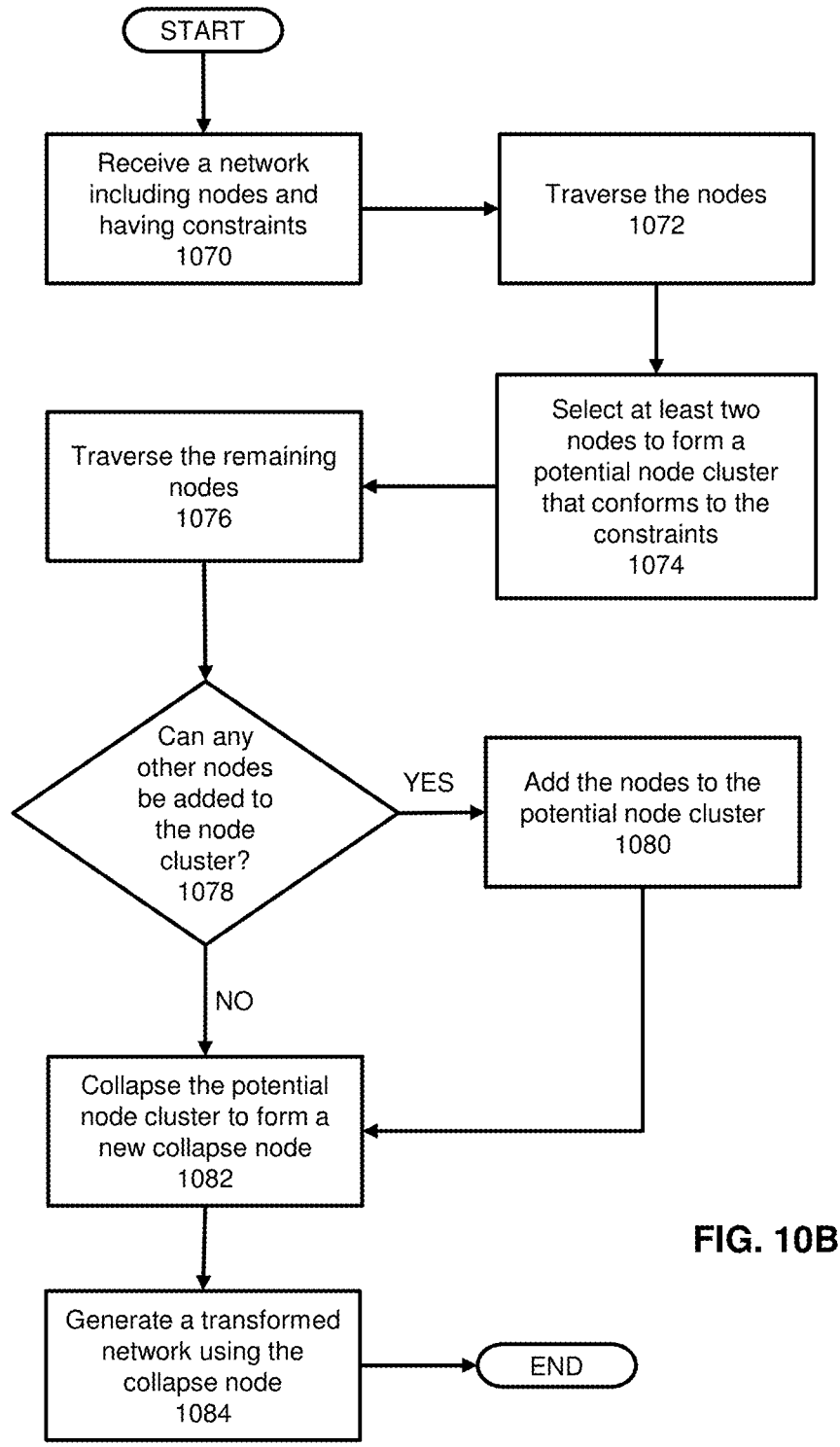
FIG. 10B shows a flow process for implementing node cluster grouping in accordance with the various aspects and embodiments of the invention.

Referring now to FIG. 10B, a process for generating node clusters is shown in accordance with the various aspects of the invention. At step 1070, the system receives, as an input, the network having nodes (and links) and constraints. As outlined below in accordance with the various embodiment of the invention, the input network is an edge clustered network. In accordance with the various aspects and embodiment of the invention, the input network is any network, including a network that has not been transformed using edge clustering. At step 1072, in accordance with the various aspects of the invention, the nodes are traversed to determine or identify at least two nodes that can be combined to form a potential node cluster. In accordance with one aspect of the invention, at step 1072 all the nodes are traversed. In accordance with one aspect of the invention, at step 1072 the nodes are traversed until at least two nodes are identified that can be combined to form a potential node cluster. At step 1074, the identified nodes are selected to form the potential node cluster. At step 1076, in accordance with some aspects of the invention, the remaining nodes are traversed. At step 1078, if other nodes are identified that can be combined with the potential node cluster, then at step 1080 the identified nodes are added to the potential node cluster. If at step 1078 other nodes are not identified to add to the potential node cluster, then at step 1082 the potential node cluster is collapsed, as outlined below, to form a new collapsed node. At step 1084, the system generates a transformed network using the new collapse node. In accordance with the various aspects of the invention, the system repeats the process on the transformed network until all the different possible node clusters are identified. Each iteration of the process can result in a new transformed network and the process can be repeated on the new transformed network resulting from the previous iteration, which is outline in detail below in accordance with the various aspects and embodiment of the invention disclosed herein.

Figure 11:
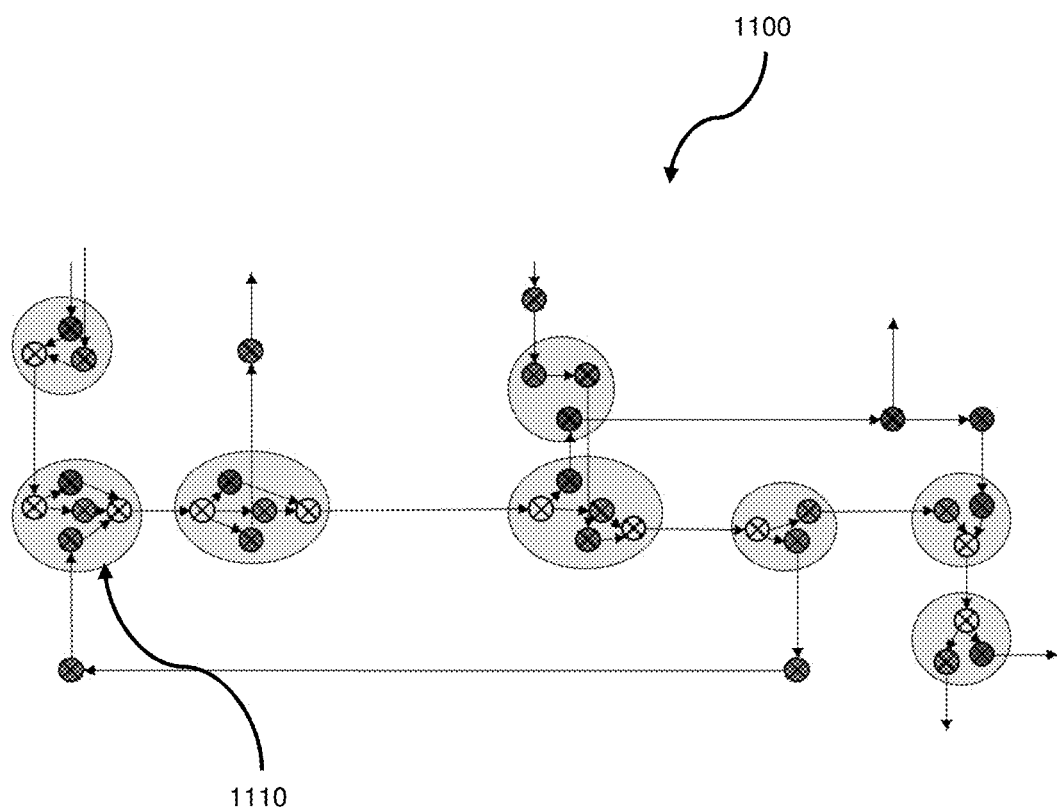
FIG. 11 shows a map of an edge clustered network with potential node clusters in accordance with the various aspects and embodiments of the invention.

Referring now to FIG. 11, in accordance with the various aspects and embodiment of the invention, an edge clustered network 1100 is shown. The network 1100 includes three trunks and eight potential node clusters, such as node cluster 1110. The system performs a transformation referred to as node clustering. Node clusters are groups of nodes that are placed together, which are compatible. A compatible node pair is a node pair that does not make the resulting node exceed the maximal bound on the number of ingresses and egresses ports of the node, which is a parameter of the method, and does not introduce a new cycle to the network. A compatible pair should also honor performance objectives when the system is accounting for performance constraints and metrics.

The compatible nodes, such as switch elements, are grouped (clustered) to produce a network using less resources, such as less logic elements and less wires. The process of node clustering operates iteratively and in a multi-pass scheme. The system traverses a list of nodes. The system groups the nodes into potential clusters based on proximity in the floorplan. The system uses an iterative process that starts with one node and keeps on adding new nodes to the potential cluster considering a "Manhattan ball" around the bucket centroid. Once the system cannot add any new node to the potential cluster, the potential cluster is considered fully formed. The system proceeds to start from a new node not already in any of the previously built potential clusters.

Using the potential node clusters, the system traverses the potential node clusters and performs a cost analysis for each with respect to a score function. In accordance with one aspect of the invention, the score function is based on the cluster size. In accordance with one aspect of the invention, once all the potential node clusters are analyzed to get the cost value, the system sorts the potential node clusters in descending order of that cost. In accordance with various other aspects of the invention, the potential node clusters can be sorted in other ways and the scope of the invention is not limited thereby.

The system traverses the sorted list of potential node clusters and process them one a time. For a currently selected potential node cluster, the system iteratively identifies all compatible pairs of nodes and scores them with respect to the gain they bring if they are collapsed together. In accordance with various aspects of the invention, the cost is expressed in terms of WL. In accordance with various aspects of the invention, the cost is expressed in terms performance. In accordance with various aspects of the invention, the cost is expressed in terms of the growth of merging node. In accordance with various aspects of the invention, the cost is expressed in terms of any combination of WL, performance, or growth. Once all pairs are costed, the system selects the top compatible pair, removes the compatible pair from the list of candidate nodes, and implement the collapsing of the compatible node pairs.

In accordance with the various aspects of the invention, collapsing of two nodes N1 and N2 includes removing the nodes N1 and N2. Then the removed nodes are replaced with a new node N3. The system connects all predecessors of N1 and N2 towards N3. The system then connects N3 towards all successors of N1 and N2. The system updates all routes that were going through N1 and N2 with N3 in order to incrementally keep the routes updated. Once the system updates all routes, the system then updates the list of candidate nodes with the new node N3. The system also updates the cost of the impacted candidate nodes. The system then selects the new top candidate pair and proceed along the same scheme. The system iteratively repeats this process until all nodes are collapsed or there is no admissible pair that can be used for collapsing.

Figure 12:
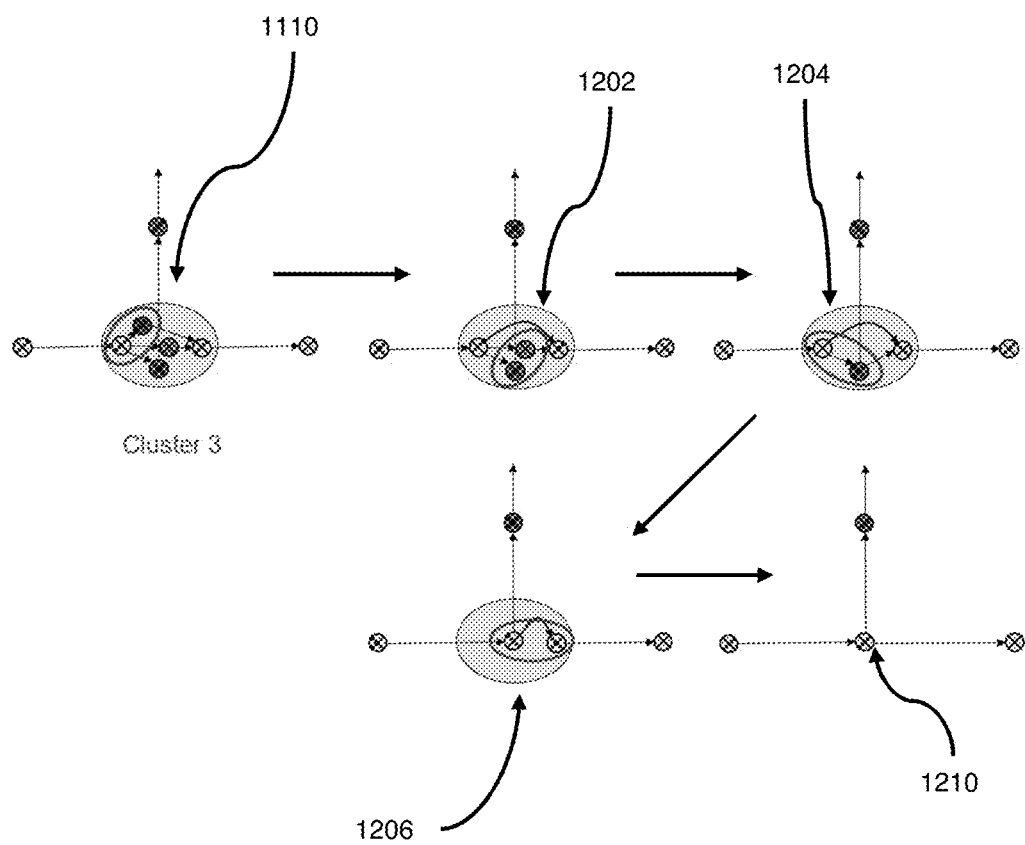
FIG. 12 show the steps for collapsing a potential node cluster in accordance with the various aspects and embodiments of the invention.

Referring now to FIG. 12. a potential node cluster 1110 of FIG. 11 being implemented in accordance with the various aspects and embodiments of the invention to produce a resulting node 1210. The system selects two nodes, as outline above, from the potential node cluster 1110 and collapses the two nodes, which are a compatible node pair, to produce a new node. The result is a new potential node cluster 1202. The system repeats the implementation process on the node cluster 1202 to generate another new potential node cluster 1204. The process is implemented on node cluster 1204 to generate a node cluster 1206. The compatible node pair of the node cluster 1206 are implemented to produce a node 1210. Once the node 1210 is generated, there are no other nodes in the potential node cluster. In accordance with the various aspects of the invention, when no more collapsing can be done within the current potential node cluster, the system proceeds to the next potential node cluster. The system proceeds using the same scheme until all potential node clusters are processed.

Figure 13:
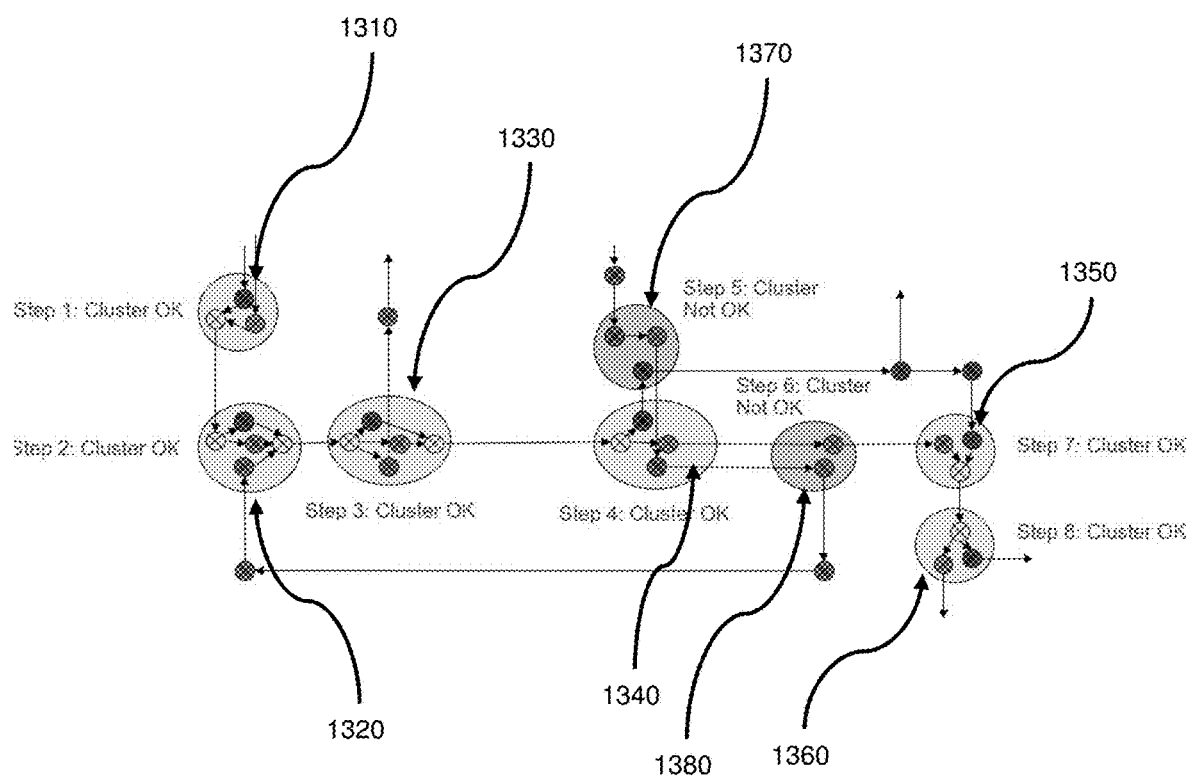
FIG. 13 shows, in accordance with the various aspects and embodiments of the invention, an input network with potential node clusters that can be collapsed as well as potential node clusters that cannot be collapsed due to network constraints.

Referring now to FIG. 13, an input network is shown having potential node clusters 1310, 1320, 1330, 1340, 1350, 1360, 1370, and 1380 in accordance with the various aspects and embodiments of the invention. The numbering of the potential node clusters in this example is arbitrary and does not denote their ranking in the sorted list. All nodes in the potential node clusters 1310, 1320, 1330, 1340, 1350, and 1360 are admissible combination that can be collapsed together. All nodes in the potential node clusters 1370 and 1380 are not admissible combination because collapsing these potential node clusters would create cycles, which is not admissible.

Figure 14:
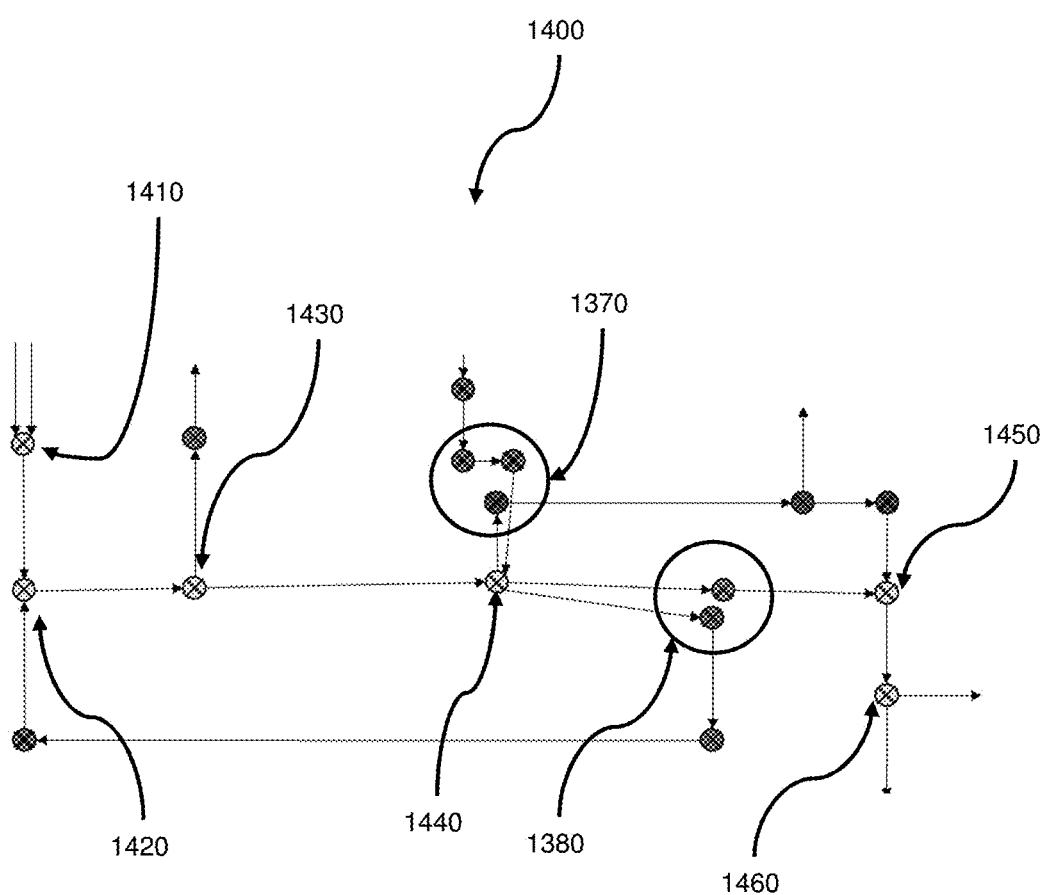
FIG. 14 shows the input network of FIG. 13 after the potential node clusters are collapsed in accordance with the various aspects and embodiments of the invention.

Referring now to FIG. 14, a final node clustering map 1400 is shown for the input network of FIG. 13. The map 1400 includes collapsed clusters 1410, 1420, 1430, 1440, 1450, and 1460 as well as nodes that were part of the node clusters 1370 and 1380 (of FIG. 13), which were not collapsed. In accordance with the various aspects of the invention, the resulting map 1400 is from the system repeating the implementation step as many times as the clustering can collapse existing nodes and can create new nodes. The system stops node clustering when no more convergence is obtained and no more nodes can be obtained by applying clustering, as evident from the map 1400. In accordance with the various aspects of the invention, the multi-pass performed by the system ensures that newly created nodes, which result from collapsing a compatible pair of nodes, are also considered for further growth and collapsing with other nodes.

In accordance with some aspects and embodiments, the tool can be used to ensure multiple iterations of the synthesis are done for incremental optimization of the NoC. After implementation and execution of the synthesis process by the system, the results are produced in a machine-readable form, such as computer files using a well-defined format to capture information. The scope of the invention is not limited by the specific format.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A method for synthesis and transformation of a network, the method comprising:
   receiving, as input, the network including a plurality of constraints for the network, wherein the network includes a plurality of edges;
   assigning all of the plurality of edges to a set of non-booked edges;
   clustering at least two edges selected from the set of non-booked edges to generate at least one edge cluster that conforms to the plurality of constraints;
   reassigning the at least two edges from the set of non-booked edges to a set of booked edges;
   collapsing the edge cluster; and
   generating a transformed network using the collapsed edge cluster.

2. The method of claim 1, wherein the network is a cycle-free network and collapsing the edge cluster maintains the cycle-free nature of the transformed network.

3. The method of claim 1, wherein the step of clustering includes:
   generating an empty edge cluster;
   selecting a first edge from the plurality of edges;
   selecting a second edge from the plurality of edges, such that the first and second edges form a set of edges; and
   assigning the set of edges to the empty edge cluster to generate the edge cluster.

4. The method of claim 3, wherein the second edge is selected if the second edge has features in common with the first edge and wherein the features include identical direction and proximity.

5. The method of claim 1 further comprising the steps of:
   generating a plurality of additional edge clusters by selecting edges from the set of non-booked edges;
   reassigning the selected edges to the set of booked edges;
   sorting the plurality of additional edge clusters to generate a list of sorted edge clusters; and
   processing, using a gain function, the sorted list of edge clusters in decreasing order of gain, wherein an edge cluster from the list of edge clusters with the highest gain in processed first.

6. The method of claim 1 further comprising:
   using network cycling to determine if collapsing the edge cluster will introduce a topological loop;
   performing the collapsing step if no topological loop is created; and
   eliminating the two edges from the plurality of edges if a topological loop is created.

7. The method of claim 1, wherein the step of collapsing comprises:
   replacing an edge cluster with a first node and a second node; and
   connecting the first node and the second node with an edge.

8. The method of claim 7 further comprising:
   connecting all start nodes for the edge cluster to the first node; and
   connecting all end nodes for the edge cluster to the second node.

9. A non-transitory computer readable medium for storing code, which when executed by one or more processors, would cause the processor to:
   receive a network including a plurality of edges and a plurality of constraints;
   assign all of the plurality of edges to a set of non-booked edges;
   cluster at least two edges selected from the set of non-booked edges;
   generate at least one edge cluster that conforms to the plurality of constraints;
   assign the at least two edges to a set of booked edges;
   collapse the edge cluster; and
   generate a transformed network using the collapsed edge cluster.

10. A method for transformation of a network, the method comprising:
    receiving, as input, the network including a plurality of nodes, wherein the network is a cycle-free network-on-chip (NoC);
    receiving, as input, a plurality of constraints for the network;
    combining at least two nodes selected from the plurality of nodes to form a first potential node cluster, wherein the node cluster conforms to the plurality of constraints;
    traversing the plurality of nodes to determine if any other node can be added to the first potential node cluster;
    collapsing the first potential node cluster to generate a collapsed node; and
    generating a transformed network using the collapsed node.

11. The method of claim 10 wherein the nodes of the first node cluster are proximately located.

12. The method of claim 10 further comprising the steps of:
    generating a plurality of potential node clusters from the remaining plurality of nodes;
    building a list of potential node clusters from the first potential node cluster and the plurality of potential node clusters;
    sorting the list of potential node clusters using a gain function to assign a gain value to each potential node cluster in the list of potential node clusters;
    collapsing each potential node cluster from the sorted list of potential node clusters in decreasing order based on gain value to generate a set of collapsed nodes; and
    updating the transformed network with the set of collapsed nodes to generate a second transformed network.

13. The method of claim 12 wherein the step of collapsing includes:

using network cycle search at each building step to determine if any potential node cluster introduces a topological loop;

committing the potential node cluster for collapsing if the topological loop is not generated;

eliminating the potential node cluster from the remaining plurality of nodes if the topological loop is generated; and updating the second transformed network.

14. The method of claim 10, wherein the step of collapsing a node cluster includes the steps of:

selecting two nodes from the node cluster;

removing the two nodes; and adding a new node to replace the two removed nodes.

15. The method of claim 14 further comprising the steps of:

connecting all predecessor nodes of the two removed nodes toward the new node;

connecting the new node toward all successor nodes of the two removed nodes; and updating all routes traveling through the two removed nodes with the new node to incrementally update the route information in the network.

16. A non-transitory computer readable medium for storing code, which when executed by one or more processors, would cause the processor to:

receive a network including a plurality of nodes;

receive a plurality of constraints for the network;

combine at least two nodes selected from the plurality of nodes to form a first potential node cluster, wherein the first potential node cluster conforms to the plurality of constraints;

traverse the plurality of nodes to determine if any other node can be added to the first potential node cluster; and collapse the first potential node cluster to generate a collapsed node, including select two nodes from the node cluster;

remove the two nodes; and add a new node to replace the two removed nodes; and generate a transformed network using the collapsed node.

17. The non-transitory computer readable of claim 16 wherein the processor is further caused to:

generate a plurality of potential node clusters from the remaining plurality of nodes;

build a list of potential node clusters from the first potential node cluster and the plurality of potential node clusters;

sort the list of potential node clusters using a gain function to assign a gain value to each potential node cluster in the list of potential node clusters;

collapse each potential node cluster from the sorted list of potential node clusters in decreasing order based on gain value to generate a set of collapsed nodes; and update the transformed network with the set of collapsed nodes to generate a second transformed network.

18. The non-transitory computer readable of claim 17 wherein the processor is further caused to:

use network cycle search at each building step to determine if any potential node cluster introduces a topological loop;

commit the potential node cluster for collapsing if the topological loop is not generated;

eliminate the potential node cluster from the remaining plurality of nodes if the topological loop is generated; and update the second transformed network.

19. The non-transitory computer readable of claim 16 wherein the processor is further caused to:

connect all predecessor nodes of the two removed nodes toward the new node;

connect the new node toward all successor nodes of the two removed nodes; and update all routes traveling through the two removed nodes with the new node to incrementally update the route information in the network.

* * * * *